United States Patent [19]

Brown

[11] Patent Number: 4,832,593
[45] Date of Patent: May 23, 1989

[54] LARGE NOZZLE FOR HOT RUNNER MOLD

[75] Inventor: Paul Brown, Orangeville, Canada

[73] Assignee: Husky Injection Molding Systems Ltd., Bolton, Canada

[21] Appl. No.: 148,029

[22] Filed: Jan. 25, 1988

[51] Int. Cl.$^4$ ............................................. B29C 45/23
[52] U.S. Cl. ............................... 425/564; 264/328.8; 264/328.9; 425/566; 425/568; 425/571; 425/572
[58] Field of Search ............... 425/549, 562, 564, 566, 425/568, 570, 571, 572, 588, 567; 264/328.8, 328.9, 328.15; 92/128

[56] References Cited

U.S. PATENT DOCUMENTS

| | | | |
|---|---|---|---|
| 2,773,284 | 12/1956 | Kelly | 425/566 |
| 3,488,810 | 1/1970 | Gellert | 425/563 |
| 3,999,894 | 12/1976 | Nakayama et al. | 92/128 |
| 4,173,448 | 11/1979 | Rees et al. | 425/549 |
| 4,212,626 | 7/1980 | Gellert | 425/562 |
| 4,378,963 | 4/1983 | Schouenberg | 425/549 |
| 4,449,915 | 5/1984 | Van Den Brink | 425/564 |
| 4,682,945 | 7/1987 | Schad | 425/549 |

OTHER PUBLICATIONS

Mold Master, System V12 "Single".
Cylinder Design, Recommendations.

Primary Examiner—Jay H. Woo
Assistant Examiner—Timothy W. Heitbrink
Attorney, Agent, or Firm—Bachman & LaPointe

[57] ABSTRACT

The present invention relates to a system for injection molding large parts. The system includes a large diameter hot runner valve gated nozzle assembly which can be removed for servicing. The assembly includes a heated nozzle body having a substantially C-shaped flow channel for conveying molten plastic to a nozzle having an injection gate and a valve arrangement for opening and closing the injection gate. The assembly further includes a nozzle extension attached to the nozzle body so as to accommodate thermal expansion of the nozzle extension. A manifold for supplying molten plastic material to the nozzle assembly is mounted and retained within a slot in the nozzle extension so as to permit sliding action of the manifold and thereby.

11 Claims, 2 Drawing Sheets

LARGE NOZZLE FOR HOT RUNNER MOLD

BACKGROUND OF THE INVENTION

The present invention relates to a system for injection molding large parts for example automotive components, door panels, instrument panels and the like which require very high flow rates of resin to fill the mold quickly.

Hot runner mold nozzles have been used in many molding applications. Typically a valve gated nozzle is used where high flow rates and a good gate mark are required. Large diameter open nozzles, i.e. nozzles having a diameter of 0.25", have been used in the past with the result that the gate mark produced thereby generally requires a post molding operation to remove the vestige. Valve gate arrangements are useful because they allow the use of gate diameters of 0.5" and larger while producing an acceptable gate mark.

Examples of valve gates are shown in U.S. Pat. Nos. 2,773,284 to Kelly, 3,488,810 to Gellert, 4,173,448 to Rees and 4,378,963 to Schouenberg. In these patents, the valve stem is either moved mechanically by a linkage or directly by means of a fluid operated piston and cylinder. Examples of valve gates where the valve stem is coaxial with the incoming flow channel and the moving mechanism is between the incoming channel and the stem are shown in U.S. Pat. Nos. 4,212,626 to Gellert, 4,378,963 to Schouenberg, and 4,449,915 to van den Brink.

All of the aforementioned patents use either hydraulic oil or compressed air to activate the piston and cylinder mechanisms which operate the valve stems. Care is taken to locate the piston and cylinder away from the heated component which contains the melt channel. By thermally insulating the piston and cylinder, the piston sealing ring is maintained at a temperature low enough to prevent it from failing.

Locating the piston, cylinder and seal in close proximity to the heated melt channel, which may be handling resin at 700° F., requires a high temperature sealing device such as a cast iron piston ring to be used. Unfortunately, previous attempts to use such sealing devices have had an unacceptable high rate of leakage. Typically, compressed air has passed from one side of the seal to the other because the ring is split to permit assembly. The rate of leakage may still allow the piston to be activated if sufficient air flow is supplied. In the case of a multicavity mold using several valve gates, the volume of air required to overcome such leakage is generally unacceptable.

Hot runner systems have also been designed in many ways to accommodate the thermal expansion of their components. Very large systems must accommodate very large thermal expansions. U.S. Pat. No. 4,173,448 to Rees shows an example of how a hot runner manifold is allowed to expand and slide across the top surface of a fixed nozzle housing. The valve assembly is fixed to the manifold and slides with it across the backing plate surface. U.S. Pat. No. 4,682,945 to Schad explains this theory in some detail.

Another system for accommodating thermal expansion is shown in U.S. Pat. No. 4,378,963 to Schouenberg. In this system, the manifold is bolted to the mold cavity plate by a screw. Due to thermal expansion the manifold will slide over a fixed nozzle housing. This causes the screw to bend. When expansions are small this method is acceptable. Larger expansions on the other hand cause the screw to fail and/or the manifold/nozzle housing seal to leak.

Hot runner systems are also designed to accommodate injection forces. The nozzle housing and manifold in such systems typically must resist the force developed by the injection pressure acting on the projected area of the gate which tends to separate the nozzle from the cavity. In U.S. Pat. Nos. 4,173,448 to Rees and 4,682,945 to Schad, this force is counteracted by a back-up insulator which supports the manifold against the mold backplate. In U.S. Pat. No. 4,378,963 to Schoueberg, the screw bolting the manifold to the mold cavity plate counteracts this force.

It is an object of the present invention to provide a large nozzle hot runner system for injection molding large parts.

It is a further object of the present invention to provide a system as above having an improved piston sealing arrangement which permits the use of a cast iron sealing ring in a high temperature environment.

It is still a further object of the present invention to provide a system as above capable of accommodating both large manifold expansions and injection forces.

These and other objects and advantages will become apparent from the following description and drawings in which like reference numeral depict like elements.

SUMMARY OF THE INVENTION

In accordance with the present invention, the foregoing objects and advantages are achieved by an injection molding system having a large diameter hot runner valve gated nozzle assembly. The assembly comprises a heated nozzle body housing a flow channel through which liquified plastic flows and a valve means for opening and closing an injection gate at one end of the flow channel. The valve means comprises a cylinder within the nozzle body, a piston within the cylinder, and a valve stem connected to the piston. The piston has an annular head portion with an annular shaped groove therein for receiving a cast iron sealing ring. Unlike other known constructions, the flow channel passes around instead of through the cylinder in the nozzle body. To this end, the flow channel has a substantially C-shaped configuration.

The assembly further includes a nozzle extension mounted to the nozzle body. The nozzle extension has a slot for housing a manifold and a passageway connecting the flow channel in the nozzle body to the manifold. A manifold cap is provided for trapping the manifold in the slot and permitting only sliding action of the manifold through the slot as a result of thermal expansion. A removal ring for locating the nozzle extension within a cavity plate is provided. The locating ring serves to support the nozzle assembly to resist the sliding forces generated by thermal expansion of the manifold. Still further, the nozzle body is removably joined to the mold cavity so as to resist injection forces acting on the injection gate.

It has been found that the system of the present invention and in particular the nozzle assembly design provides many advantages. First, the nozzle assembly can be easily withdrawn to facilitate servicing by removing the locating ring and the means joining the nozzle body to the mold cavity. Second, due to the arrangement of the elements, thermal expansion of the nozzle extension takes place in a direction away from the mold cavity in a substantially unrestricted manner. As a result, the manifold can move substantially uniformly away from the mold cavity by the expansion amount.

DETAILED DESCRIPTION

Figure 1:
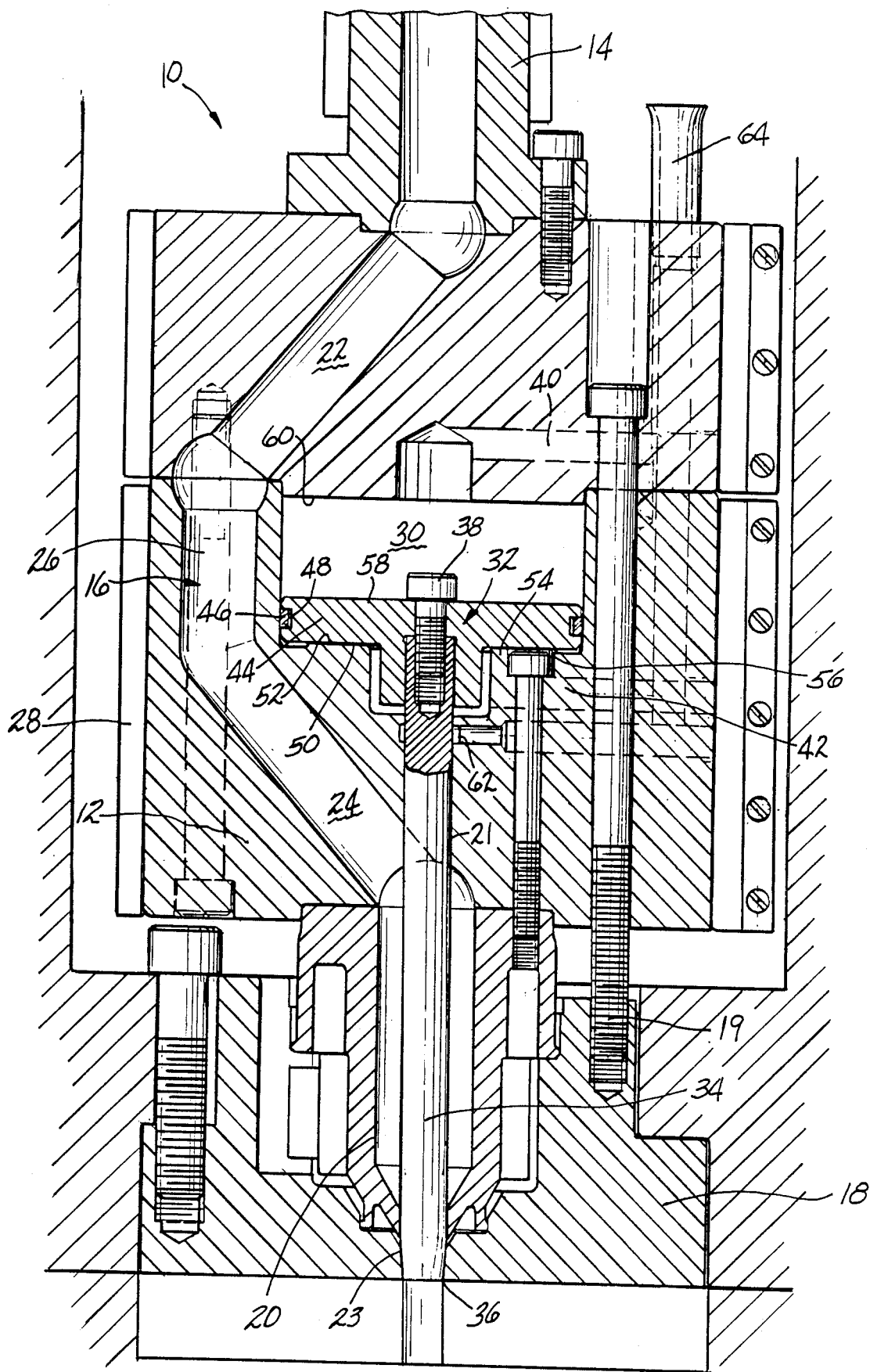
FIG. 1 is a cross sectional view of a portion of the nozzle assembly of the present invention.

The injection molding systems of the present invention are characterized by the presence of a large diameter hot runner valve gated nozzle assembly 10. The assembly 10 is joined to a mold cavity 18 by suitable means such as bolts 19 for retaining the nozzle assembly to the mold cavity and for resisting the injection forces acting on the projected area of an injection gate. The nozzle assembly comprises a nozzle body 12 and a nozzle extension 14 joined to the nozzle body.

Referring now to FIG. 1, the nozzle body 12 contains a flow channel 16 through which flows liquified plastic material to be supplied to the mold cavity 18. The channel 16 has a large diameter nozzle 20 with a gate at one end and is connected to a source (not shown) of molten plastic material at a second end. For reason which will be explained hereinafter, the flow channel 16 has a substantially C-shaped configuration formed by two channels 22 and 24 respectively positioned at an angle with respect to a central longitudinal axis of the nozzle body and a central channel 26 extending parallel to the longitudinal axis and connecting the two angled channels. The body 12 is heated by an external heater 28 to maintain the body at the temperature needed to ensure flow of the plastic material.

The nozzle body 12 is further characterized by a valve arrangement for opening and closing the nozzle 20. The valve arrangement includes a cylinder 30 within the nozzle body, a piston 32 within the cylinder and a valve stem 34. The valve stem 34 in a gate closed position extends through the nozzle 20 to close the gate and an opening 23 in a mold and in the gate open position has its tip 36 retracted from the gate and the opening. The body of the valve stem 34 is positioned within a bore 21 in the nozzle body 12 while its tip extends into the nozzle 20. The valve stem 34 may be joined to the piston 32 in any suitable manner such as by a bolt or screw 38.

Figure 4:
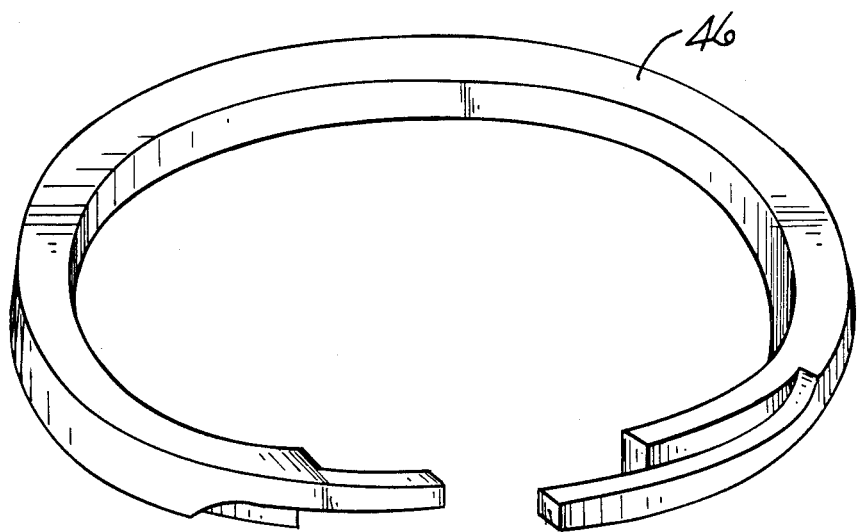
FIG. 4 illustrates a cast iron piston ring for use in the nozzle assembly of the present invention.

The piston 32 may have any desired shape. Preferably, it has an annular disc-shaped piston head 44. To substantially prevent the leakage of fluid from one side of the piston to the other, a sealing ring 46 is housed within an annular groove 48 in the head 44. Preferably, the sealing ring 46 is formed by a cast iron, split piston ring such as that shown in FIG. 4. A cast iron piston ring is preferred because the heat associated with the nozzle body requires the use of a high temperature sealing device. A split ring is preferred to facilitate assembly.

The cylinder 30 in the nozzle body 12 is shaped and arranged so that when the piston 32 is in either of its extreme positions, the piston seals against a portion of the body itself to substantially prevent the leakage of air from the cylinder. For example, FIG. 1 shows the piston 32 in the gate closed position. In this position, the lower surface 50 of the piston head lies against portions 52, 54, and 56 of the nozzle body. Similarly when the piston 32 is in the gate open position, the upper surface 58 of the piston head 44 seats against portion 60 of the nozzle body. The primary advantage to this arrangement is that although the sealing ring 46 will permit fluid leakage when the piston 32 is not in either extreme position, this is not detrimental to the performance of the nozzle assembly. It is, however, important to be able to maintain fully open or fully closed positions of the valve stem 34 without leakage and this configuration makes it possible. Testing has shown that the sealing ring 46 runs in and, in fact, leaks less after 150,000 cycles than initially.

The piston 32 is moved between its open and closed positions by a fluid such as compressed air supplied through channels 40 and 42 in the nozzle body 12. The channels 40 and 42 are positioned within the nozzle body so that one is on one side of the piston head 44 while the other is on the opposite side of the piston head. The channels 40 and 42 may be connected to a source (not shown) of fluid via any suitable valve arrangement (not shown) known in the art.

In some nozzle body designs, the molten plastic flow channel passes through the cylinder chamber housing the piston for operating the valve stem. This has been found to be a potentially troublesome configuration. Should there be a leak of plastic material from the flow channel, the plastic material could interfere with the operation of the piston and valve stem as well as with the operation of the nozzle. The present invention avoids this problem by passing the fluid channel 16 around the cylinder 30 so that the central channel 26 is positioned in close proximity to but outwardly of the cylinder 30.

During use, liquid plastic material flowing through the channel 16 may leak into the valve stem bore 21 at its junction with the nozzle 20. The nozzle body 12 is provided with a drain channel 62 to collect and remove any such material. The drain channel 62 communicates with an outlet 64 through which the material can be vented.

As previously discussed, thermal expansion of the components in hot runner nozzle systems can be troublesome. For example, a manifold used to supply molten plastic to an injection gate may expand longitudinally away from the center of the manifold assembly. In the case of large manifolds, several feet long, this expansion may amount to several one hundredths of an inch.

Figure 2:
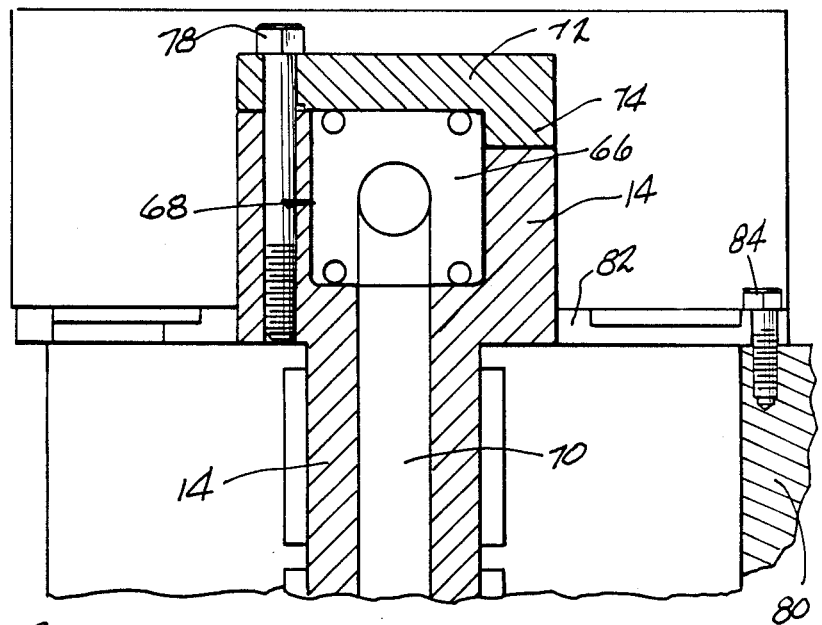
FIG. 2 is a cross sectional view of another portion of the nozzle assembly of the present invention.
Figure 3:
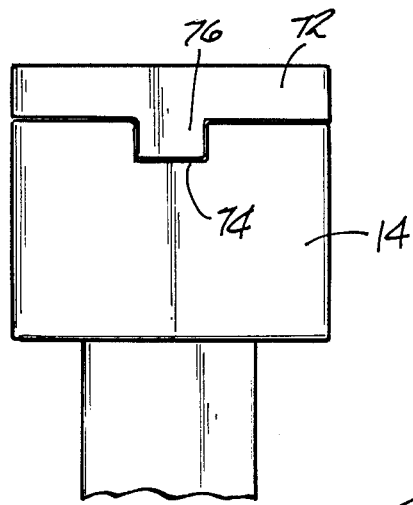
FIG. 3 is a side view of the portion of the nozzle assembly shown in FIG. 2.

Referring now to FIG. 2, the injection molding system of the present invention accommodates large thermal expansions by positioning the manifold 66 for supplying molten plastic in a slot 68 in the top of the nozzle extension 14 attached to the nozzle body 12. The manifold 66 communicates with a source (not shown) of molten plastic material. It also communicates with the flow channel 16 in the nozzle body via passageway 70 in the extension 14. With this arrangement, the manifold 66 is free to expand longitudinally away from the center of the manifold assembly.

A manifold cap 72 is provided to trap the manifold 66 in the slot 68 and thereby permit only a sliding action of the manifold through the slot as a result of thermal expansion. The manifold cap 72 is positioned on top of the manifold 66 by a keyway 74 cut into the top of the nozzle extension 14 and a mating portion 76 on the cap. Bolt(s) 78 are provided to retain the cap in the desired position.

The nozzle extension 14 attached to the nozzle body is located within a cavity plate 80 by a locating ring 82. The ring 82 is joined to the plate by suitable fastening means such as bolts or screws 84. The ring 82, in addition to fixing the location of the extension 14, supports the nozzle assembly so as to resist the sliding forces generated by the expansion of the manifold.

It has been found that this arrangement offers several significant benefits. First, the entire nozzle assembly 10 can be withdrawn from the rear of the mold for servicing merely by removing locating ring 82 and the retaining bolts 19. Second, by retaining the assembly at the gate end, the nozzle extension 14, which can be 3 feet or longer, can thermally expand rearwardly in an unrestricted manner. As a result of this, the manifold simply moves uniformly away from the cavity by the expansion amount. In this way, large thermal expansions are further accommodated.

It is apparent that there has been provided in accordance with this invention a large nozzle for hot runner mold which fully satisfies the objects, means, and advantages set fourth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An injection molding system for making large parts which comprises:
    a nozzle body housing a flow channel through which liquified plastic material flows;
    said flow channel having a nozzle at a first end and being connected to a source of said plastic material at a second end;
    said nozzle body further containing valve means for opening and closing said nozzle and an injection gate in a mold;
    said valve means comprising a cylinder within said nozzle body, a piston within said cylinder, and a valve stem connected to said piston;
    said flow channel within said nozzle body passing around said cylinder;
    a nozzle extension mounted to said nozzle body to form a nozzle assembly therewith; and
    said nozzle extension having a slot for housing a manifold connected to said plastic material source and a passageway for connecting said second end of said flow channel in said nozzle body with said manifold.

2. An injection molding system in accordance with claim 1 which further comprises:
    a keyway cut into the top of said nozzle extension;
    a manifold cap having a portion adapted to fit within said keyway; and
    means for retaining said cap in position relative to said keyway;
    whereby said cap traps said manifold in said slot and permits only sliding action of said manifold through said slot.

3. An injection molding system in accordance with claim 2 which further comprises:
    a cavity plate;
    a ring for locating said nozzle extension within said cavity plate and for supporting the nozzle assembly o resist the sliding forces generated by thermal expansion of manifold; and
    means for joining said locating ring to said cavity plate.

4. An injection molding system in accordance with claim 3 which further comprises:
    a mold cavity; and
    means for joining the nozzle body to the mold cavity so as to resist injection forces acting on said injection gate.

5. An injection molding system in accordance with claim 4 wherein said nozzle assembly can be withdrawn from said machine to facilitate servicing by removing said locating ring and said means for joining said nozzle body to the mold cavity and wherein thermal expansion of said nozzle extension takes place in a direction away from the mold cavity and substantially unrestricted so that said manifold moves substantially uniformly away from the mold cavity by the expansion amount.

6. An injection molding system for making large molded parts which comprises:
    a mold plate having at least one mold cavity;
    a large diameter hot runner valve gated nozzle assembly including a heated nozzle body, a nozzle extension attached to said nozzle body and a manifold connected to a source of molten plastic material; and
    means for accommodating thermal expansion of said manifold, said thermal expansion accommodating means comprising a slot in said nozzel extension for receiving said manifold and means for trapping said manifold in said slot and for permitting only sliding action of said manifold through said slot due to thermal expansion.

7. An injection molding system in accordance with claim 6 wherein said trapping means comprises a keyway in said nozzle extension, a manifold cap having a portion adapted to fit within said keyway and means for joining said cap to said nozzle extension.

8. An injection molding system in accordance with claim 6 which further comprises:
    means for supporting the nozzle assembly to resist the sliding forces generated by the thermal expansion of the manifold.

9. An injection molding system in accordance with claim 8 which further comprises:
    a cavity plate; and
    said supporting means being formed by a ring for locating the nozzle extension in said cavity plate.

10. An injection molding system in accordance with claim 6 which further comprises:
    said nozzle body having a nozzle with an injection gate at one end; and
    means for retaining said nozzle assembly at said gate end so as to permit thermal expansion of said nozzle extension to take place in a direction away from said gate end in a substantially unrestricted manner and so as to permit said manifold to move substantially uniformly away from said gate end by an amount equal to the thermal expansion of said manifold.

11. An injecion molding system in accordance with claim 10 wherein said retaining means also forms a means for resisting injection forces acting on the projected area of an injection gate in said nozzle.

* * * * *

UNITED STATES PATENT AND TRADEMARK OFFICE
CERTIFICATE OF CORRECTION

PATENT NO. : 4,832,593

DATED : May 23, 1989

INVENTOR(S) : Paul Brown

It is certified that error appears in the above-identified patent and that said Letters Patent is hereby corrected as shown below:

Column 6, claim 3, line 1, "o resist" should read
--to resist--.

Signed and Sealed this

Thirteenth Day of March, 1990

Attest:

JEFFREY M. SAMUELS

Attesting Officer

Acting Commissioner of Patents and Trademarks